(12) United States Patent
Grabau

(10) Patent No.: US 9,181,923 B2
(45) Date of Patent: Nov. 10, 2015

(54) METHOD OF MANUFACTURING A WIND TURBINE BLADE COMPRISING STEEL WIRE REINFORCED MATRIX MATERIAL

(75) Inventor: Peter Grabau, Kolding (DK)

(73) Assignee: LM GLASFIBER A/S, Kolding (DK)

( * ) Notice: Subject to any disclaimer, the term of this patent is extended or adjusted under 35 U.S.C. 154(b) by 1246 days.

(21) Appl. No.: 13/058,601

(22) PCT Filed: Aug. 14, 2009

(86) PCT No.: PCT/EP2009/060547
§ 371 (c)(1),
(2), (4) Date: Mar. 23, 2011

(87) PCT Pub. No.: WO2010/018225
PCT Pub. Date: Feb. 18, 2010

(65) Prior Publication Data
US 2011/0164987 A1 Jul. 7, 2011

(30) Foreign Application Priority Data
Aug. 14, 2008 (EP) .................................... 08014496

(51) Int. Cl.
*F03D 1/06* (2006.01)
*B29C 33/12* (2006.01)
*B29C 70/44* (2006.01)
*B29C 70/88* (2006.01)
*B29L 31/08* (2006.01)

(52) U.S. Cl.
CPC ............... *F03D 1/065* (2013.01); *B29C 33/12* (2013.01); *B29C 70/44* (2013.01); *B29C 70/885* (2013.01); *B29L 2031/085* (2013.01); *Y02E 10/721* (2013.01)

(58) Field of Classification Search
CPC ....... F03D 1/065; Y02E 10/721; B29C 33/12; B29C 70/44; B29C 70/885
USPC .......... 416/223 R, 229 R, 230, 241 R, 241 A, 416/241 B; 29/889.7, 889.72
See application file for complete search history.

(56) References Cited

U.S. PATENT DOCUMENTS

| 7,198,471 B2 * | 4/2007 | Gunneskov et al. ...... 416/229 R |
| 2004/0166299 A1 * | 8/2004 | Haislet et al. .............. 428/292.1 |
| 2006/0188378 A1 * | 8/2006 | Bech et al. ................ 416/227 R |

FOREIGN PATENT DOCUMENTS

| EP | 1 316 400 A1 | 6/2003 |
| GB | 2 346 107 A | 8/2000 |
| WO | 03/008800 A1 | 1/2003 |
| WO | 2005/092586 A1 | 10/2005 |
| WO | 2006/066593 A1 | 6/2006 |

* cited by examiner

*Primary Examiner* — Edward Look
*Assistant Examiner* — Maxime Adjagbe
(74) *Attorney, Agent, or Firm* — Nath, Goldberg & Meyer; Jerald L. Meyer; Tanya E. Harkins

(57) ABSTRACT

A method of manufacturing a shell construction part of a wind turbine blade, the shell construction part being made of a fibre reinforced polymer material including a polymer matrix and fibre reinforcement material embedded in the polymer matrix. The method comprises the steps of a) providing a forming structure comprising a mould cavity and having a longitudinal direction, b) placing the fibre reinforcement material in mould cavity, c) providing a resin in the mould cavity simultaneously with and/or subsequently to step b), and d) curing the resin in order to form the composite structure, wherein at least 20% by volume of the fibre reinforcement material consists of metallic wires.

29 Claims, 7 Drawing Sheets

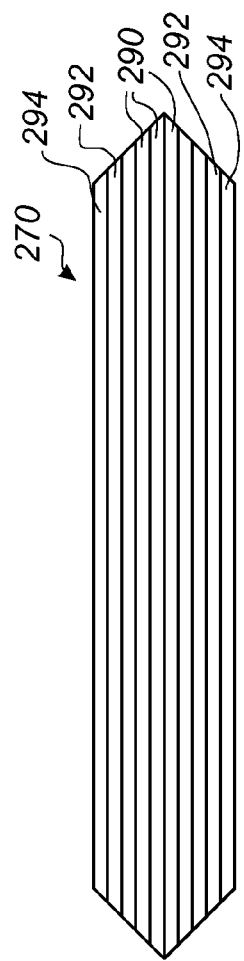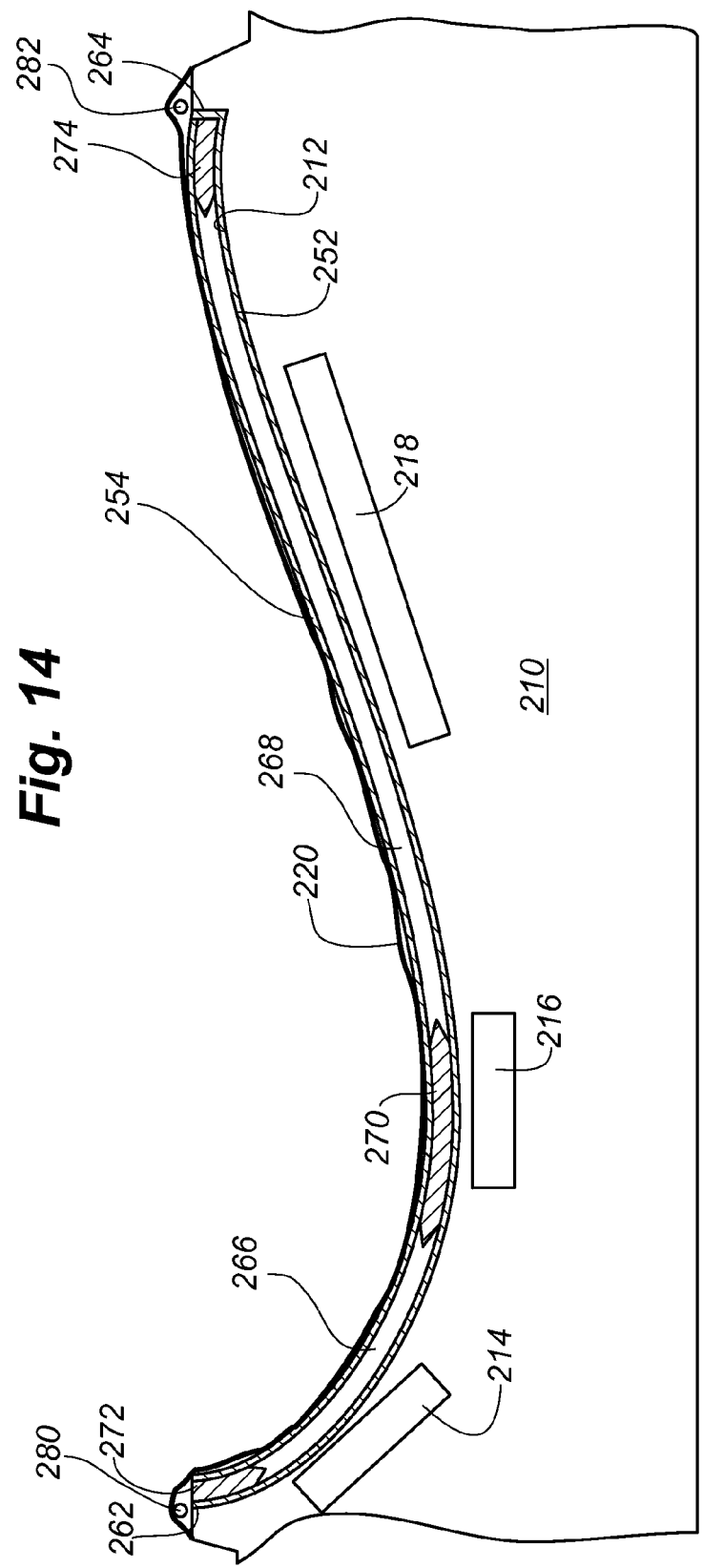

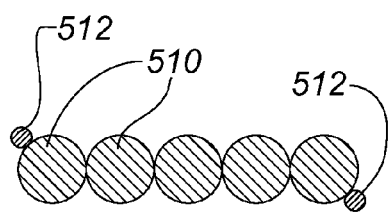
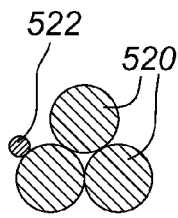
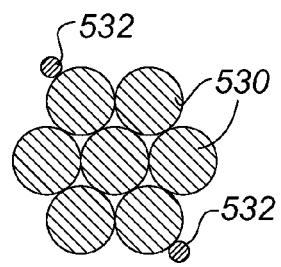
*Fig. 7*   *Fig. 8*   *Fig. 9*
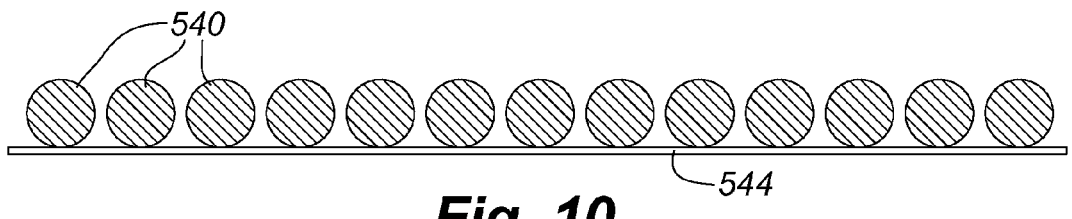
*Fig. 10*
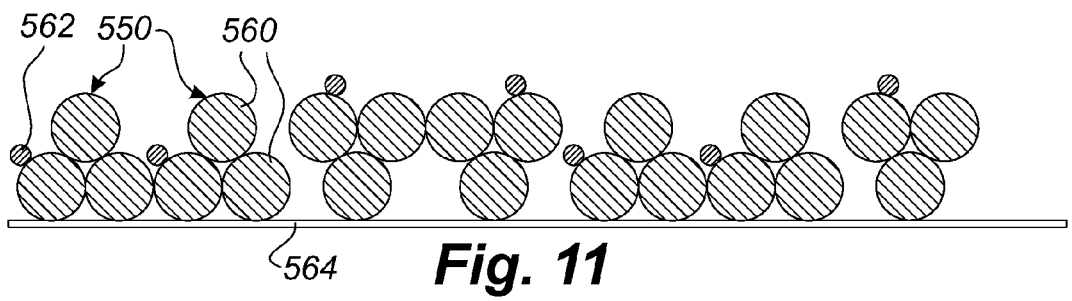
*Fig. 11*
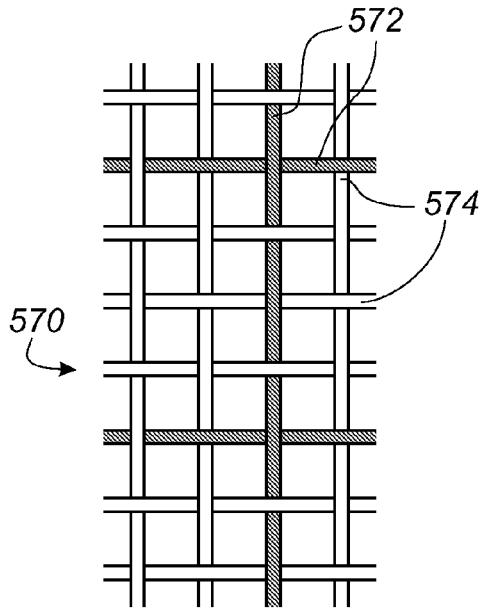
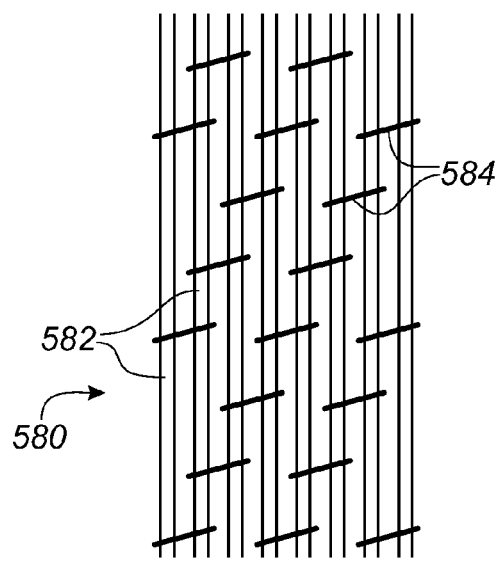
*Fig. 12*   *Fig. 13*

METHOD OF MANUFACTURING A WIND TURBINE BLADE COMPRISING STEEL WIRE REINFORCED MATRIX MATERIAL

This is a National Phase Application filed under 35 U.S.C. 371 as a national stage of PCT/EP2009/060547, filed Aug. 14, 2009, an application claiming the benefit from the European patent Application No. 08014496.7, filed Aug. 14, 2008the content of each of which is hereby incorporated by reference in its enitirety.

TECHNICAL FIELD

The present invention relates to a wind turbine blade including a shell structure made of a fibre reinforced polymer material including a polymer matrix and fibre reinforcement material embedded in the polymer matrix. The invention further relates to a method of manufacturing a shell construction part of a wind turbine blade, the shell construction part being made of a fibre reinforced polymer material including a polymer matrix and fibre reinforcement material embedded in the polymer matrix.

BACKGROUND

Vacuum infusion or VARTM (vacuum assisted resin transfer moulding) is one method, which is typically employed for manufacturing composite structures, such as wind turbine blades comprising a fibre reinforced matrix material. During the manufacturing process, liquid polymer, also called resin, is filled into a mould cavity, in which fibre material priorly has been inserted, and where a vacuum is generated in the mould cavity hereby drawing in the polymer. The polymer can be thermoset plastic or thermoplastics. Typically, uniformly distributed fibres are layered in a first rigid mould part, the fibres being rovings, i.e. bundles of fibre bands, bands of rovings or mats, which are either felt mats made of individual fibres or woven mats made of fibre rovings. A second mould part, which is often made of a resilient vacuum bag, is subsequently placed on top of the fibre material and sealed against the first mould part in order to generate a mould cavity. By generating a vacuum, typically 80 to 95% of the total vacuum, in the mould cavity between the first mould part and the vacuum bag, the liquid polymer can be drawn in and fill the mould cavity with the fibre material contained herein. So-called distribution layers or distribution tubes, also called inlet channels, are used between the vacuum bag and the fibre material in order to obtain as sound and efficient a distribution of polymer as possible. In most cases the polymer applied is polyester or epoxy, and the fibre reinforcement is most often based on glass fibres or carbon fibres.

During the process of filling the mould, a vacuum, said vacuum in this connection being understood as an under-pressure or negative pressure, is generated via vacuum outlets in the mould cavity, whereby liquid polymer is drawn into the mould cavity via the inlet channels in order to fill said mould cavity. From the inlet channels the polymer disperses in all directions in the mould cavity due to the negative pressure as a flow front moves towards the vacuum channels. Thus, it is important to position the inlet channels and vacuum channels optimally in order to obtain a complete filling of the mould cavity. Ensuring a complete distribution of the polymer in the entire mould cavity is, however, often difficult, and accordingly this often results in so-called dry spots, i.e. areas with fibre material not being sufficiently impregnated with resin. Thus dry spots are areas where the fibre material is not impregnated, and where there can be air pockets, which are difficult or impossible to avoid by controlling the vacuum pressure and a possible overpressure at the inlet side. In vacuum infusion techniques employing a rigid mould part and a resilient mould part in the form of a vacuum bag, the dry spots can be repaired after the process of filling the mould by puncturing the bag in the respective location and by drawing out air for example by means of a syringe needle. Liquid polymer can optionally be injected in the respective location, and this can for example be done by means of a syringe needle as well. This is a time-consuming and tiresome process. In the case of large mould parts, staff have to stand on the vacuum bag. This is not desirable, especially not when the polymer has not hardened, as it can result in deformations in the inserted fibre material and thus in a local weakening of the structure, which can cause for instance buckling effects.

Often the composite structures comprise a core material covered with a fibre reinforced material, such as one or more fibre reinforced polymer layers. The core material can be used as a spacer between such layers to form a sandwich structure and is typically made of a rigid, lightweight material in order to reduce the weight of the composite structure. In order to ensure an efficient distribution of the liquid resin during the impregnation process, the core material may be provided with a resin distribution network, for instance by providing channels or grooves in the surface of the core material.

Resin transfer moulding (RTM) is a manufacturing method, which is similar to VARTM. In RTM the liquid resin is not drawn into the mould cavity due to a vacuum generated in the mould cavity. Instead the liquid resin is forced into the mould cavity via an overpressure at the inlet side.

Prepreg moulding is a method in which reinforcement fibres are pre-impregnated with a pre-catalysed resin. The resin is typically solid or near-solid at room temperature. The prepregs are arranged by hand or machine onto a mould surface, vacuum bagged and then heated to a temperature, where the resin is allowed to reflow and eventually cured. This method has the main advantage that the resin content in the fibre material is accurately set beforehand. The prepregs are easy and clean to work with and make automation and labour saving feasible. The disadvantage with prepregs is that the material cost is higher than for non-impregnated fibres. Further, the core material need to be made of a material, which is able to withstand the process temperatures needed for bringing the resin to reflow. Prepreg moulding may be used both in connection with a RTM and a VARTM process.

Further, it is possible to manufacture hollow mouldings in one piece by use of outer mould parts and a mould core. Such a method is for instance described in EP 1 310 351 and may readily be combined with RTM, VARTM and prepreg moulding.

WO03/008800 describes a number of prefabricated strips arranged in sequence in the periphery. The strips consist of fibrous composite material, preferably carbon fibres. In additionally an aluminium mesh is arranged within a blade shell for lightning protection.

As for instance blades for wind turbines have become bigger and bigger in the course of time and may now be more than 60 meters long, the impregnation time in connection with manufacturing such blades has increased, as more fibre material has to be impregnated with polymer. Furthermore, the infusion process has become more complicated, as the impregnation of large shell members, such as blades, requires control of the flow fronts to avoid dry spots, said control may e.g. include a time-related control of inlet channels and vacuum channels. This increases the time required for drawing in or injecting polymer. As a result the polymer has to stay liquid for a longer time, normally also resulting in an increase in the curing time. Additionally, the wind turbine industry has grown at a nearly exponential rate over the past few decades, thereby increasing the demand for throughput of manufactured wind turbine blades. This increased demand cannot be satisfied by building new factories alone, but also requires that the manufacturing methods are optimised.

DISCLOSURE OF THE INVENTION

It is an object of the invention to obtain a new blade and a new method of manufacturing such a blade, and which overcomes or ameliorates at least one of the disadvantages of the prior art or which provides a useful alternative.

According to a first aspect of the invention, this is obtained by a blade, wherein at least 20% by volume of the fibre reinforcement material consists of metallic wires. The wind turbine blade may either comprise individual shell construction parts, which are adhered to each other, e.g. a first shell construction part defining the suction side of the wind turbine blade and a second shell construction part defining the pressure side of the wind turbine blade. The two shell parts may be glued to each other at flanges at the leading edge and the trailing edge of the blade. Alternatively, the shell structure may be formed as a single shell structure.

According a second aspect of the invention, the object is obtained by a method for manufacturing a shell construction part of a wind turbine blade, the shell construction part being made of a fibre reinforced polymer material including a polymer matrix and fibre reinforcement material embedded in the polymer matrix, wherein the method comprises the steps of: a) providing a forming structure comprising a mould cavity and having a longitudinal direction, b) placing the fibre reinforcement material in mould cavity, c) providing a resin in the mould cavity simultaneously with and/or subsequently to step b), and d) curing the resin in order to form the composite structure, wherein at least 20% by volume of the fibre reinforcement material consists of metallic wires.

In contrary to WO03/008800, the metallic wires are used for reinforcing the composite structure. Also, in WO03/008800, the carbon fibre contents of the strips is much higher than the aluminium contents. Thus, the ratio between volume of the aluminium mesh and volume of the carbon fibres is much less than 20%.

By using a comparatively high amount of steel wires, the overall time for supplying resin and curing can be substantially decreased due to the steel wires having a diameter or other inner dimension, which is substantially larger than that of glass fibres or carbon fibres, which are conventionally used in manufacturing of wind turbine blades. Due to the larger diameter of the wires, the voids are also larger, which in turn means that the liquid resin can propagate and impregnate the fibre reinforcement material at a faster rate. Thereby, the fibre material can be impregnated faster and consequently, the resin needs to be liquid for a shorter time, thus having the potential of decreasing the curing time also. Further, by using of metallic, electrically conducting wires, the blade wall itself may function as a lightning receptor and down conductor, thus alleviating the need for a separate lightning receptor and down conductor. Furthermore, the use of larger wires makes the use of high viscosity resin systems feasible. This is typically not possible when using glass fibres or carbon fibres due to the fine threads making impregnation with such resin impossible. This is particularly limiting within the field of thermoplastics. Also, due to the strength of metallic fibres, it is possible to manufacture a thinner shell, thus making it possible to lowering the impregnation time and subsequent curing time even further.

The metallic wires may for instance be multistrand wires or monofilaments, preferably monofilaments. Preferably, the metallic wires are steel wires. The metallic wires may be coated or primed with e.g. zinc or brass. Further, a size may be applied to the metallic wires in order for the wire to have an affinity for a certain resin.

According to a first embodiment, the wind turbine blade has a length of at least 40 meters. Alternatively, the wind turbine blade has a length of at least 50 meters, or at least 60 meters.

According to a preferred embodiment, the metallic wires have a maximum inner cross-sectional dimension in the range between 0.04 mm and 1 mm, or in range between 0.07 and 0.75, or in the range between 0.1 mm and 0.5 mm. Maximum inner cross-sectional dimension means for instance the diameter of the wires or the large axis of a wire having an elliptical cross-section. These dimensions have shown to have the best trade-off between optimising the impregnation time and the strength or stiffness of the blade during subsequent use of the blade on a wind turbine.

According to a first advantageous embodiment, the wind turbine blade comprises at least a first longitudinally extending reinforcement section comprising a plurality of fibre layers including a fibre reinforcement material, and wherein at least 50% by of the fibre reinforcement material in the at least first reinforcement section consists of metallic wires. The increased stiffness of for instance steel wires compared to glass fibres or carbon fibres makes it possible to make the first longitudinal reinforcement section substantially thinner.

Such a longitudinally extending reinforcement section is also called a main laminate. The wind turbine blade may comprise several reinforcement sections. Typically, a wind turbine blade comprises such a reinforcement section at both the suction side and the pressure side of the blade. However, the blade may comprise a second reinforcement section on the pressure side and suction side, especially if the blade is very long, for instance more than 60 meters. Further, a wind turbine blade typically comprises reinforcement sections at the leading edge and trailing edge of the blade also.

According to another advantageous embodiment, the at least first longitudinally extending reinforcement section extends at least along 30%, or 40%, or 50%, or 60%, or 70%, or 75% of the length of the wind turbine blade, thus providing an efficient reinforcement of the blade along substantially the entire longitudinal length of the blade.

In one embodiment according to the invention, at least 30%, or 40%, or 50%, or 60%, or 70%, or 75%, or 80% by volume of the fibre reinforcement material of the wind turbine blade consists of metallic wires. In another embodiment according to the invention, at least 60%, or 70%, or 75%, or 80% by volume of the fibre reinforcement material of the at least first longitudinally extending reinforcement section consists of metallic wires.

According to an advantageous embodiment, the metallic wires are steel wires, optionally coated with another metal, e.g. zinc or brass coated steel wires. In one advantageous embodiment according to the invention, the at least first longitudinally extending reinforcement section comprises a number of outer fibre layers comprising second fibres having a maximum cross-sectional dimension, which is substantially smaller than that of the metallic wires. Since the fibres in the outer layer are substantially smaller than the steel wires, the voids between fibres at the outer surface of the wind turbine are smaller, and the outer surface may be smoother. Further, the more densely packed fibres increase the fibre density at the outer surface, which increases the interlaminar shear strength at the outer surface, thereby lowering the probability of longitudinally extending cracks forming in the laminate.

According to advantageous embodiments, the maximum inner cross-sectional dimension is at least 2, 3, 5, 10, 25, 50, or even 100 times smaller than the maximum inner cross-sectional dimension of the metallic wires.

Since the wind turbine blade is typically constructed as a hollow shell construction, the outer layers may define a part of an outer surface of the wind turbine blade and/or an inner surface of the wind turbine blade.

According to an advantageous embodiment, the blade comprises a number of outer layers and/or a number of inner layers comprising fibres having a maximum inner dimension, which is substantially smaller than that of the steel wires. Thereby, the entire outer surface and/or inner surface of a cross-section of the wind turbine blade may obtain a smoother texture. In practice, this is carried out in step b) of the method according to the invention by placing a number of outer layers with such fibres in the mould cavity.

According to yet another advantageous embodiment, a quantitative ratio between the metallic wires and the second fibres changes gradually from a first ratio at an inner part of the at least first reinforcement section to a second ratio at the number of outer layers. Thereby, a gradual transition in stiffness through the shell construction is obtained, thus preventing the formation of boundary surfaces with stress formations and lowering the risk of delamination of the various fibre layers.

In one embodiment according to the invention, the outer fibre layers comprise chopped or woven fibres, preferably made of glass fibre or carbon fibre, and wherein the fibres are oriented in a plurality of directions, i.e. multidirectional fibre layers are used. Thus, according to this embodiment, the fibres of a second kind are preferably made of glass fibres or carbon fibres. This provides a particularly simple method of obtaining a smooth surface.

In another embodiment according to the invention, the blade comprises a number of fibre layers including both metallic fibres and fibres of a second kind. Thus, such hybrid fibre mats can, for instance, be used to form the gradual change in the quantitative ratio between the two kinds of fibres, e.g. by use of hybrid mats having different amounts of steel wires woven into a glass fibre mat.

In yet another embodiment according to the invention, the metallic wires are arranged substantially parallel. Advantageously, the metallic wires are arranged substantially in the longitudinal direction of the wind turbine blade. Thus, the metallic wires are arranged so that they provide an optimum stiffness in the longitudinal direction of the blade. Thus according to an advantageous embodiment, the various reinforcement sections comprise a plurality of layers with longitudinally extending steel fibres and a number of outer layers comprising chopped or woven fibres. The metallic wires provide for a given stiffness of the wind turbine blade, so that the wind turbine blade can be used for an upwind wind turbine without risking deflection to a degree, where the blades are at risk of striking the tower of the wind turbine.

The outer layers forming the inner and/or the outer surface of the shell construction part may be arranged in the entire cross-section of the shell construction part so that the outer layers cover both the reinforcement sections and adjacent core material, such as foamed polymer or balsa wood.

According to another advantageous embodiment, the at least first longitudinally extending reinforcement section comprises a number of fibre layers with parallel metallic wires and a number of intermediate resin distribution layers. Since the metallic wires are arranged parallel, for instance in the longitudinal direction of the blade, the metallic wires may prohibit or at least reduce the propagation rate of the liquid transverse to the direction of the metallic wires. Intermediate resin distribution layers may remedy this, thus ensuring a complete impregnation of the fibre layers during the impregnation process. The term "distribution layer" is to be understood as a layer, which allows a higher flow speed for liquid polymer or resin than the metallic wires do. The resin distribution layers may for instance be made from thin layers of a porous core material, e.g. balsa wood or foamed polymer, optionally provided with channels, which are formed like recesses in the surface, and which extend along the plane of the distribution layer, often perpendicular to the longitudinal direction of the blade. The channels may, however, also expand in other angles compared to the longitudinal direction of the blade. Alternatively, the distribution layer may be made of a net or a fibre mat with a high permeability.

According to one embodiment, the blade comprises a number of fibre layers having a corrugated surface and comprising metallic wires. The metallic wires may also have a corrugated surface in order to achieve a mechanical interlock with the resin or matrix material.

According to an advantageous embodiment, the metallic wires have a rough surface, for instance provided by sand blasting or glass blasting the surface of the metallic wires. Thereby, the resin bonds better to the metallic wires, thereby lowering the probability of delamination of layers comprising the metallic wires. Accordingly, it is possible to use non-twisted monowires for the reinforcement of the wind turbine blade.

According to another advantageous embodiment, the metallic wires are arranged to form a twisted wire geometry. Such geometry may create an interlocking geometry, which forms a mechanic interlock with the resin or matrix material.

It is also possible to use wires, where a number of filaments are arranged in a core, the wire further having a wrap wire, which is wrapped for instance helically around the core. The wrap wire may be tightened around the wires in order to share the load between the different filaments. The wrap wire may be smaller than the individual filaments of the core. The wires may be arranged in a nested or stacked geometry. Alternatively, the wires may be arranged in a single layer. Preferably, the filaments of the core have a maximum inner dimension according to the previously mentioned dimensions for the maximum inner dimension of the metallic wires.

According to another advantageous embodiment, the metallic wires are arranged in woven, knitted or glue or scrim assembled layers. It is for instance possible to use a polyester knit yarn to spiral the structural wire and optionally using an additional metallic wrapping wire. The wrapping wire may be crossed back and forth between the metallic wires and tied to the wires by the spiralling polyester knit thread. The wrapping wire may be used to create a knitted structure that maintains a given wire spacing. It is also possible to use intermeshing wrapping wires. Alternatively, the wires may be glued onto a backing sheet or a scrim. The backing material may become part of the finished wind turbine blade or it may dissolve in the liquid resin. Thus, a number of different methods of forming a tape comprising the metallic wires is possible. A number of different tapes or rolls of tapes having different widths may be used. These tapes may be arranged in the mould cavity by rolling the tapes in the longitudinal direction of the mould or equivalently the longitudinal direction of the finished wind turbine blade.

The metallic wires may be arranged to form a continuous or discontinuous contact line with adjacent wires. The wires may be arranged unidirectional, preferably in the longitudinal direction of the finished wind turbine blade. Alternatively, the wires may be multidirectionally oriented.

It is possible to arrange the metallic wires so as to make them impermeable. However, according to a preferred embodiment the wires are arranged so as to make the layers permeable to liquid resin and so as to be able to quickly wet the layers comprising metallic wires.

In one method according to the invention, a plurality of fibre layers including a fibre reinforcement material are arranged on top of each other in the mould cavity in step b) in order to provide a longitudinally extending reinforcement section, where at least 50% by volume of the fibre reinforcement material in the at least first reinforcement section consists of metallic wires.

According to another advantageous method, the mould cavity in the forming structure in step a) is provided by providing a first mould part having a first forming surface with a contour that defines at least a part of an outer surface of the shell construction part, and a second mould part, and sealing the second mould part against the first mould part. Thus, the fibre reinforcement material and resin is arranged or provided in the mould cavity. The first mould part may for instance be a rigid mould part. The second mould part may for instance be a vacuum bag. Alternatively, the second mould part may be a rigid mould part having a second moulding surface with a contour that defines at least a part of an outer surface of the shell construction part.

According to yet another advantageous embodiment, the mould cavity is connected to a source of uncured fluid resin via at least one resin inlet communicating with the mould cavity, and uncured resin from the source of uncured resin is supplied to the mould cavity through the at least one resin inlet during step c) so as to fill the mould cavity with resin. This embodiment relates to a resin transfer moulding manufacturing method, wherein the resin is supplied to the mould cavity via a pressure differential between the source of uncured resin and the mould cavity.

Advantageously, at least one vacuum outlet communicating with the mould cavity is connected to the mould cavity, and the mould cavity is evacuated prior to step c) via the at least one vacuum outlet. Thereby, the pressure differential may be formed by creating a vacuum or underpressure in the mould cavity in order to draw the liquid resin into the mould cavity. Thus, this embodiment relates to vacuum infusion or vacuum assisted resin transfer moulding (VARTM).

According to one advantageous embodiment, a number of pre-impregnated elements comprising a fibre reinforcement material are inserted in the first mould part or the mould cavity during step b). The use of so-called prepregs may be combined with both the RTM and VARTM methods. Typically, the prepregs are heated in order to liquidise the resin, allowing it to reflow and proving a uniform impregnation of all the fibre reinforcement material. The heating eventually allows the resin to cure.

According to one particularly advantageous embodiment, the shell construction part of the wind turbine blade is made as one closed piece, wherein the forming structure comprises: a mould core and outer mould parts arranged to close around the mould core in order to form a mould cavity there between, the outer mould parts comprising at least: a first mould part comprising a first forming surface with a contour that defines at least a part of an outer surface of the shell construction part, and a second mould part comprising a second forming surface with a contour that defines at least a part of an outer surface of the shell construction part, and wherein the fibre reinforcement material in step b) is arranged on an outer mould part and/or the mould core. Typically, the mould core is removed from the shell construction after curing of the resin. Thereby, a single hollow shell construction is formed having a smooth surface with no glue flanges or similar.

The invention is particularly suited for hollow moulding methods, since the larger voids between the metallic wires ensure that air in the mould cavity is forced forward by flow fronts of liquid resin during the impregnation or injection process. Thus, it is ensured that no air pockets are formed in the composite structure, i.e. the wind turbine blade. When a wind turbine blade is manufactured as two or more separate shell part, which are subsequently assembled, e.g. by gluing the parts together, the separate shell parts are often manufactured via a VARTM process using a first rigid mould part and a vacuum bag. Since the vacuum bag is transparent, it is possible to observe the flow fronts of liquid resin. Thus, it is also possible to observe a possible formation of an air pocket. Thereby, an operator may be able to remedy such formations, for instance by reversing the flow fronts by switching the operation of the vacuum outlet(s) and/or the resin inlet(s). This is further explained in WO067058541 by the present applicant. However, in a closed, hollow moulding process, it is not possible to observe the propagation of the liquid resin during the impregnation process. Therefore, the use of metallic wires is particularly suited for hollow moulding methods.

According to one advantageous embodiment, liquid resin is supplied from a lower part of the mould cavity during step c). Thus, the resin inlets are arranged at a low point in the cross-section of the mould cavity during step c). Thereby, the flow front of liquid resin moves upwards during the impregnation process. Since air is lighter than the resin, gravity thus further reduces the possibility of formation of air pockets in the composite structure.

According to an advantageous embodiment, the closed mould is rotated about a longitudinal axis prior to supplying liquid resin to the mould cavity in step c). Typically, the first forming surface and the second forming surface correspond to the pressure side and suction side of the wind turbine blade, respectively. During step b) the first mould part is arranged so that the first forming surface faces upwards. After all material has been arranged in the mould cavity, the closed mould may be turned approximately 90 degrees about the longitudinal axis in order to supply liquid from resin inlets, which in this mould position is arranged at a low point in the cross-section of the closed mould, e.g. at a trailing edge or leading edge of the wind turbine blade. Further, a vacuum outlet may be arranged at the highest point of the cross-section of the closed mould, optionally with an overflow vessel for collecting resin, which inadvertently has been sucked into the vacuum outlet.

This principle can be used in other moulding aspects, namely that resin is supplied from a low point in a mould cavity and using gravity for preventing the formation of air pockets in the composite structure of the wind turbine blade.

Thus, according to yet another aspect, the invention provides a method for manufacturing a shell construction part of a wind turbine blade, the shell construction part being made of a fibre reinforced polymer material including a polymer matrix and fibre reinforcement material embedded in the polymer matrix, wherein the method comprises the steps of: a) providing a forming structure comprising a mould cavity and having a longitudinal direction, b) placing the fibre reinforcement material in mould cavity, c) arranging the forming structure so that resin inlets are positioned at a low point of the forming structure, d) providing a resin in the mould cavity simultaneously with and/or subsequently to step b), and e) curing the resin in order to form the composite structure. This may be achieved in a number of ways. Typically the forming structures form moulding wind turbine shell parts are oblong. Thus, it may be possible to lift one end of the forming structure in order to obtain an inclination, and supplying resin from the other end. Alternatively, the forming surface may in itself be formed with an inclination in the longitudinal direction of the oblong forming structure.

The resin may be a thermosetting resin, such as epoxy, vinylester, polyester. The resin may also be a thermoplastic, such as nylon, PVC, ABS, polypropylene or polyethylene. Yet again the resin may be a thermosetting thermoplastic, such as cyclic PBT or PET.

However, according to a particularly advantageous embodiment, the resin comprises an in-situ polymerisable thermoplastic material. The in-situ polymerisable thermoplastic material may advantageously be selected from the group consisting of pre-polymers of: polybutylene terephthalate (PBT), polyamide-6 (pre-polymer is caprolactam), polyamide-12 (pre-polymer is laurolactam) alloys of polyamide-6 and polyamide-12; polyurethanes (TPU), polymethylmethacrylate (PMMA), polyethylene terephthalate (PET), polycarbonate (PC), polyetheretherketone (PEEK), polyetherketone (PEK), polyethersulfone (PES), polyphenylenesulphide (PPS), polyethylenenaphthalate (PEN) and polybutylenenaphthalate (PBN), cyclic poly(1,4-butylene terephthalate) (CBT) and/or combinations thereof.

The in-situ polymerisable thermoplastic material has the advantage that it may be handled in its pre-polymer state and can be handled in as a liquid, a powder or pellets. Accordingly, the material may be used for pre-impregnating the fibre reinforcement material, i.e. in a pre-preg. Alternatively, it may be sprayed on in powder form on the fibre reinforcement material or be arranged in the mould parts as separate layers.

In-situ polymerisable thermoplastic materials, such as CBT, has the advantage that they obtain a water-like viscosity when heated to a temperature of approximately 150 degrees Celsius. Thereby, it is possible to quickly impregnate the fibre reinforcement material of very large composite structures to be moulded and subsequently curing the resin in very short cycle times.

CTB is available as one-part systems, where a catalyst is premixed into the resin, and where the catalyst is activated for instance by heating, and as two-part systems, where the catalyst and resin are kept separately until immediately before use.

In some situations it may be advantageous—as previously explained—to draw in additional in-situ polymerisable thermoplastic material in order to impregnate the entire fibre reinforcement material. In such a situation it may be advantageous to use one-part systems for the pre-supplied resin and two-part systems for the additional resin.

The term polymerisable thermoplastic material means that the material may be polymerised once at the manufacturing site.

According to an advantageous embodiment, a gel coat is applied to a forming surface defining the exterior of the wind turbine blade. Additionally a waxy substance may be applied to the inner surface of the various rigid mould parts in order to prevent the composite structure to adhere to the surface.

BRIEF DESCRIPTION OF THE DRAWINGS

The invention is explained in detail below with reference to the drawing(s), in which FIG. 2 shows a schematic cross section of a second embodiment of a mould part with fibre material arranged in the mould part, FIG. 7 shows a first embodiment of steel wires for reinforcing the shell construction of a wind turbine blade, FIG. 8 shows a second embodiment of steel wires for reinforcing the shell construction of a wind turbine blade, FIG. 9 shows a third embodiment of steel wires for reinforcing the shell construction of a wind turbine blade, FIG. 10 shows a fourth embodiment of steel wires for reinforcing the shell construction of a wind turbine blade, FIG. 11 shows a fifth embodiment of steel wires for reinforcing the shell construction of a wind turbine blade, FIG. 12 shows a hybrid mat for reinforcing the shell construction of a wind turbine blade, FIG. 13 shows a intermeshed mat for reinforcing the shell construction of a wind turbine blade, FIG. 14 shows a cross section of a reinforcement section in a wind turbine blade.

DETAILED DESCRIPTION OF THE INVENTION

Figure 1:
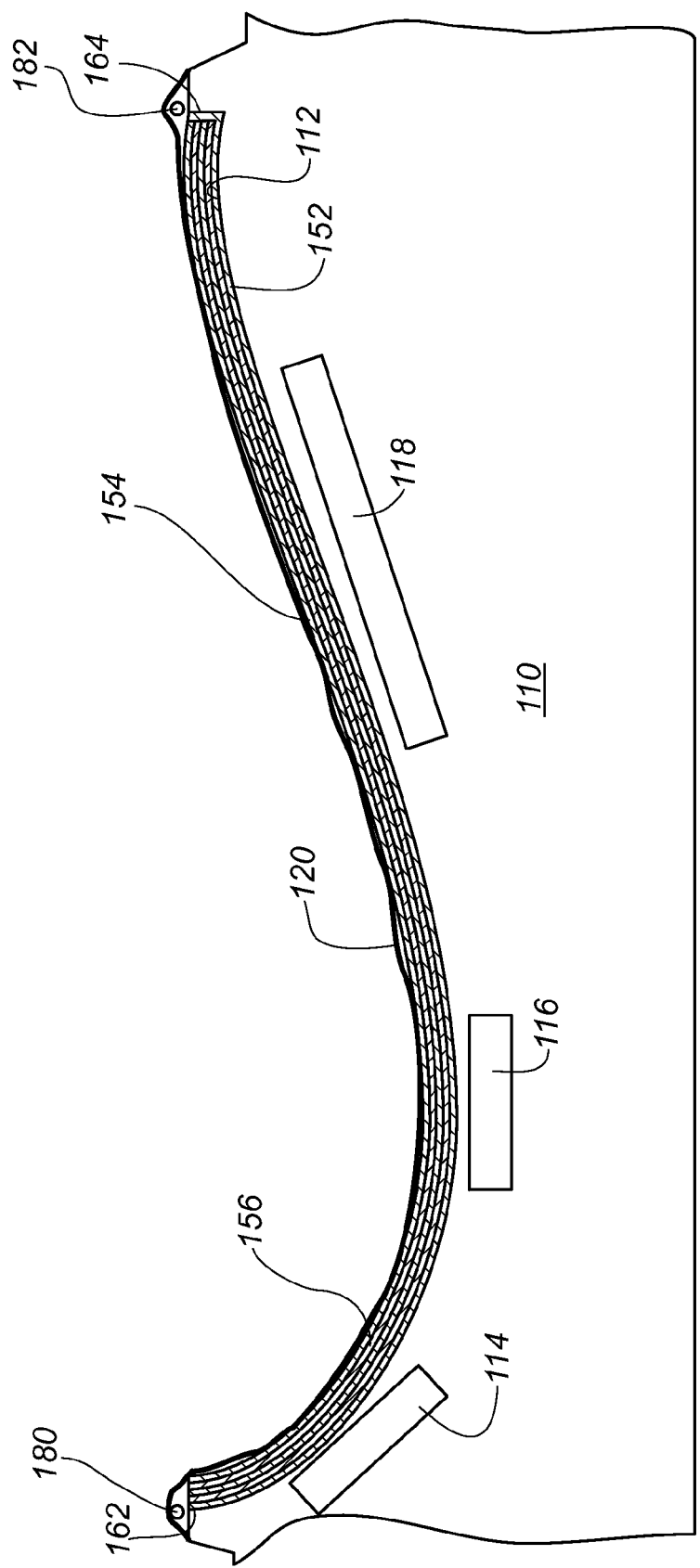
FIG. 1 shows a schematic cross section of a first embodiment of a mould part with fibre material arranged in the mould part.

FIG. 1 shows a cross-sectional view through a first mould part 110 for use in a VARTM process. The first mould part 110 has an upwardly facing forming surface 112, and a vacuum bag 120 is sealed against the first mould part 110, thus forming a mould cavity between the first mould part 110 and the vacuum bag 120. A number of fibre layers 152, 154, 156 are placed in the mould cavity, these fibre layers being included in a finished wind turbine blade shell part comprising a leading edge 162 and a trailing edge 164. The fibre layers comprise a majority of metallic wires, preferably steel wires. The fibre layers may comprise steel fibres only. Alternatively, hybrid fibre mats comprising steel fibres and for instance glass fibres or carbon fibre may be used. The inner layers are optionally coated with a gel coat, which define the exterior surface of the shell part. The arrangement for the VARTM process comprises a number of vacuum outlets for initially evacuating the mould cavity in an evacuation process and later drawing in liquid resin supplied from a number of resin inlet channels in an impregnation process. In the depicted embodiment, a resin inlet 180 is provided at a first rim of the first mould part 110, viz. the leading edge 162 of the finished wind turbine blade shell part, and a vacuum outlet 182 is provided at a second rim of the first mould part 110, viz. the trailing edge 164 of the finished wind turbine blade shell part. The particular arrangement of the resin inlet 180 and the vacuum outlet is meant as an example only, and many variations are possible.

The first mould part 110 may comprise magnet means in form of a number of electromagnets 114, 116, 118. The magnet means may be formed as a single electromagnet along the forming surface 112 or may comprise a plurality of electromagnets 114, 116, 118 as shown in the figure. The electromagnets can be used to retain or secure the fibre layers 152, 154, 156 against the forming surface 112 during the process of arranging the fibre layers 152, 154, 156 in the mould cavity and/or the evacuation process and/or the following resin impregnation process.

Preferably the steel wires are made of monofilaments having a maximum inner cross-sectional dimension in the range between 0.04 mm and 1 mm, or in the range between 0.07 and 0.75, or in the range between 0.1 mm and 0.5 mm. Preferably, the steel wires or monofilaments have a substantially circular or elliptical cross-section. Accordingly, the maximum inner cross-sectional dimension corresponds to the diameter or major axis of the wire or monofilament.

By using a majority of steel wires, the overall time for supplying resin and curing can be substantially decreased due to the steel wires having a diameter or other inner dimension, which is substantially larger than that of glass fibres or carbon fibres, which are conventionally used in manufacturing of wind turbine blades. Due to the larger diameter of the wires, the voids are also larger, which in turn means that the liquid resin can propagate and impregnate the fibre material at a faster rate. Thereby, the fibre material can be impregnated faster and consequently, the resin needs to be liquid for a shorter time, thus having the potential of decreasing the curing time also. Further, by using of metallic, electrically conducting wires, the blade wall itself may function as a lightning receptor and down conductor, thus alleviating the need for a separate lightning receptor and down conductor. Furthermore, the use of larger wires makes the use of high viscosity resin systems feasible. This is typically not possible when using glass fibres or carbon fibres due to the fine threads making impregnation with such resin impossible. This is particularly limiting within the field of thermoplastics.

The outer fibre layers, i.e. the lower fibre layer 152 and the upper fibre layer 154 may be made of fibres having a diameter substantially smaller than that of the inner fibre layers 156 comprising steel wires. The outer fibre layers 152, 154 may for instance comprise chopped or woven glass fibres or carbon fibres. Since the fibres in the outer layer are substantially smaller than the steel wires, the voids between fibres at the outer surface of the wind turbine are smaller, and the outer surface may be smoother. Further, the more densely packed fibres increase the fibre density at the outer surface and increase the interlaminar shear strength, thereby lowering the probability of cracks and delamination forming.

FIG. 2 shows a cross-sectional view through a second embodiment of a first mould part 210 for use in a VARTM process. The mould part 210 comprises a mould cavity formed between a forming surface 212 and a vacuum bag 220, and in which a number of fibre layers, core parts and reinforcement sections are placed, these parts being included in a finished wind turbine blade shell part. The blade shell part comprises one or more lower fibre layers 252 impregnated with resin and optionally coated with a gelcoat, which define the exterior surface of the shell part, and one or more upper fibre layers 254 impregnated with resin, and which define the interior surface of the shell part. The upper fibre layer(s) 254 and lower fibre layer(s) 252 are separated by a fibre insertion or main laminate 270 comprising a plurality of fibre layers impregnated with resin, a first core part 266 and a second core part 268, as well as a first fibre reinforcement 274 at a trailing edge 264 of the shell part and a second fibre reinforcement 272 at a leading edge 262 of the shell part.

As shown in FIG. 14, the main laminate comprises a plurality of fibre layers. The fibre layers comprise a number of inner fibre layers 290, a number of outer fibre layers 294, and a number of intermediate fibre layers 292. According to one advantageous embodiment, the inner fibre layers 290 comprise steel fibres only, whereas the outer layers 294 similar to the previous embodiment comprise chopped or woven fibres of a second type with a diameter substantially smaller than that of the steel wires. The outer layers may be made entirely of glass fibres or carbon fibres. The intermediate layers 292 may be made of hybrid mats comprising both steel wires and fibres of the second type. Thereby, a quantitative ratio between the steel wires and the second fibres gradually changes from a first ratio at the inner fibre layers 290 to a second ratio at the number of outer layers 292. Thereby, a gradual transition in stiffness through the shell construction is obtained, thus preventing the formation of boundary surfaces with stress formations and lowering the risk of delamination of the various fibre layers. By using different hybrid mats having different quantitative ratios between the steel wires and the second type fibres, a particularly smooth transition can be obtained. Such a configuration can of course also be used for the other fibre reinforcements of the shell construction or wind turbine blade.

The arrangement for the VARTM process comprises a number of vacuum outlets and a number of resin inlet channels. In the depicted embodiment, a resin inlet 280 is provided at a first rim of the first mould part 210, viz. the leading edge 262 of the wind turbine blade shell part, and a vacuum outlet 282 is provided at a second rim of the first mould part 210, viz. the trailing edge 264 of the wind turbine blade shell part. The particular arrangement of the resin inlet 280 and the vacuum outlet 282 is meant as an example only, and many variations are possible.

Similar to the first embodiment, the first mould part 210 comprises magnet means in form of a number of electromagnets 214, 216, 218. The magnet means may be formed as a single electromagnet along the forming surface 212 or may comprise a plurality of electromagnets 214, 216, 218 as shown in the figure. The electromagnets can be used to retain or secure the fibre layers 252, 254, 256 against the forming surface 212 during the process of arranging the fibre layers 252, 254, 256 in the mould cavity and/or the evacuation process and/or the following impregnation process.

Particularly the process of impregnating the main laminate 270 and other fibre reinforcements is very time consuming. Therefore, the change from using reinforcement sections comprising mainly glass or carbon fibres to reinforcement sections comprising a majority, and preferably more than 80% by volume of steel wires, reduces the overall impregnation time substantially, and thereby the overall time for manufacturing blades comprising such reinforcement sections.

Figure 3:
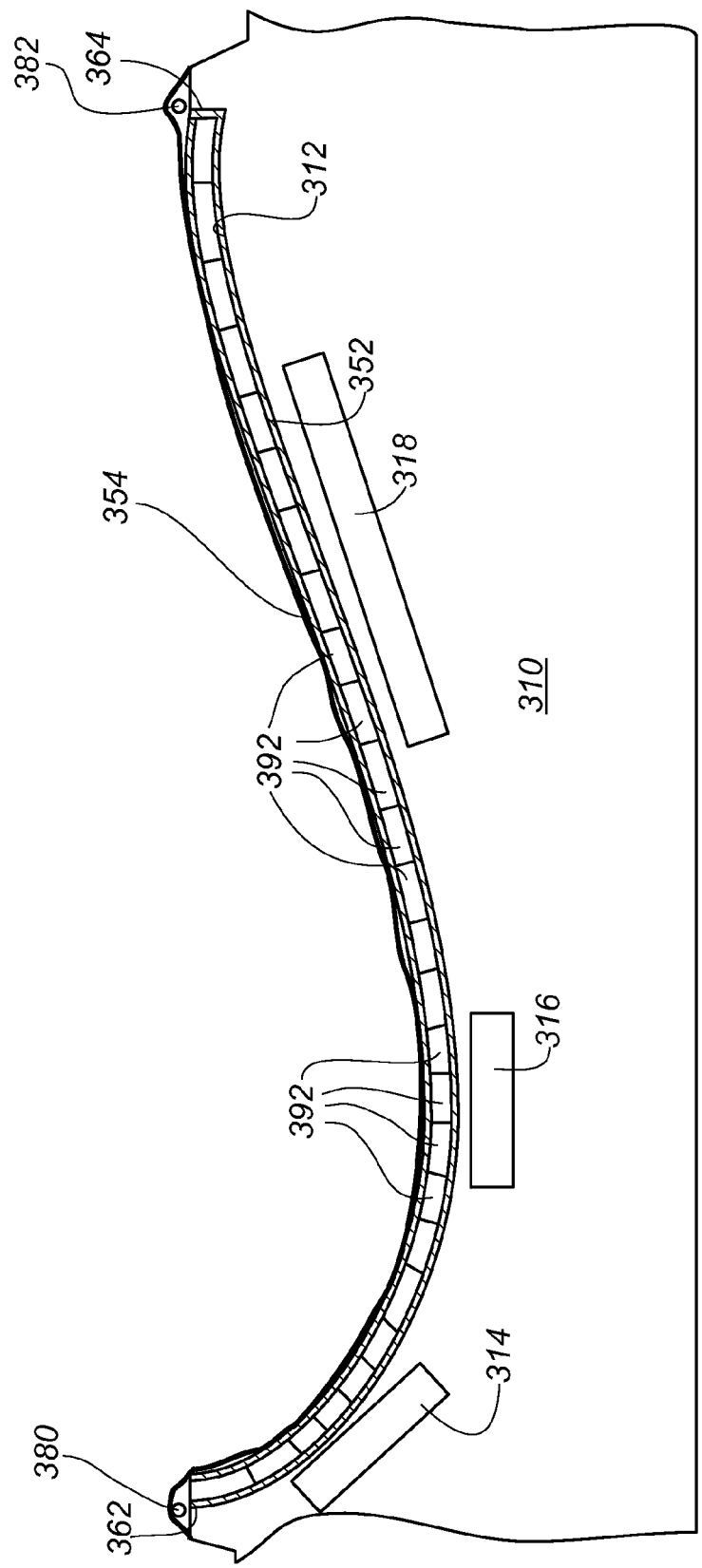
FIG. 3 shows a schematic cross section of a third embodiment of a mould part with fibre material arranged in the mould part.

FIG. 3 shows a cross-sectional view through a third embodiment of a first mould part 310 for use in a VARTM process, and in which like numerals refer to similar parts shown in FIG. 1. Therefore, only the difference between the embodiments is described.

In this embodiment a number of prepregs 392 and/or pre-cured elements comprising metallic wires, preferably steel wires, are arranged between a number of outer fibre layers 354 and a number of inner fibre layers 352, optionally coated with a gelcoat, which define a part of the exterior surface of the blade shell part. The prepregs are pre-impregnated with resin, and the mould cavity is heated to a temperature, where the resin is allowed to reflow thus filling the mould cavity and the fibre material arranged therein. The heating eventually allows the resin to cure.

Again, the outer fibre layers 352 may be made of fibres having a diameter substantially smaller than that of the steel wires in the prepregs 392. The outer fibre layers 352, 354 may for instance comprise chopped or woven glass fibres or carbon fibres.

Figure 4:
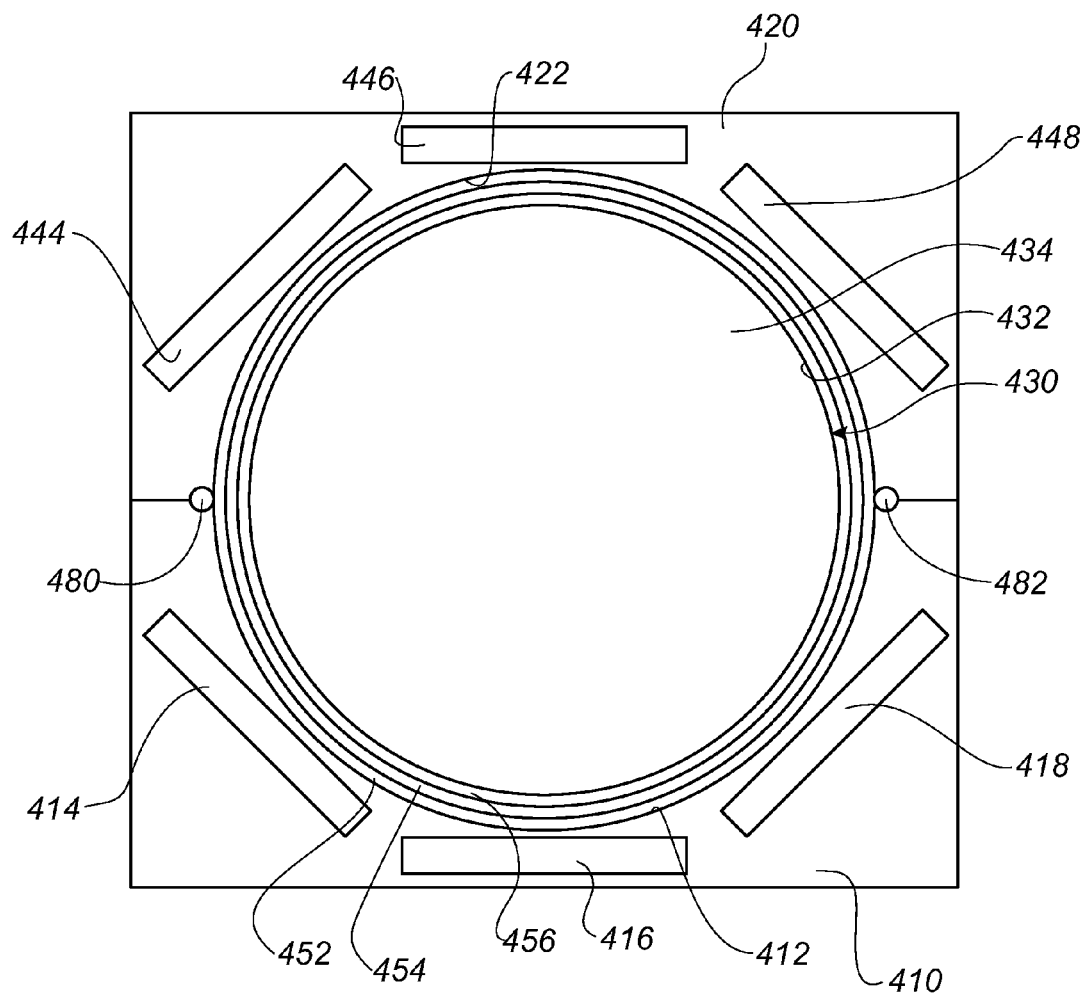
FIG. 4 shows a schematic cross section of a fourth embodiment of a mould part with fibre material arranged in the mould part.

FIG. 4 shows a cross-sectional view through a fourth embodiment of a mould for use in a VARTM process, and in which like numerals refer to similar parts shown in FIG. 1. The figure shows an embodiment in which the wind turbine blade (here depicted as a cross section of the circular root section) is manufactured as one, hollow piece instead of as two separate shell parts, which subsequently are glued together. The wind turbine blade is manufactured in a closed mould, which comprises a mould core 430 and a first mould part 410 and a second mould part 420 arranged to close around the mould core 430, thus forming a mould cavity there between. The first mould part 410 comprises a first forming surface 412 with a first contour that defines a part of the outer surface of the wind turbine blade, and the second mould part 420 comprises a second forming surface 422 with a second contour that defines another part of the outer surface of the wind turbine blade. The mould core 430 comprises an outer, flexible core part 432, which defines the inner surface of the wind turbine blade, and an internal, firm or workable core part 434. A number of fibre layers 452, 454, 456 comprising metallic wires, preferably steel wires, is arranged in the mould cavity between the outer mould parts 410, 420 and the mould core 430.

The first mould 410 part comprises a number of electro-magnets 414, 416, 418 for retaining the fibre layers 452, 454, 456 against the first forming surface 412, and the second mould part 420 comprises a number of electromagnets 444, 446, 448 for retaining the fibre layers 452, 454, 456 against the second forming surface 422. Thus the fibre layers can be secured against the forming surfaces during layup of the fibre layers and during the subsequent evacuation and impregnation procedures.

Figure 5:
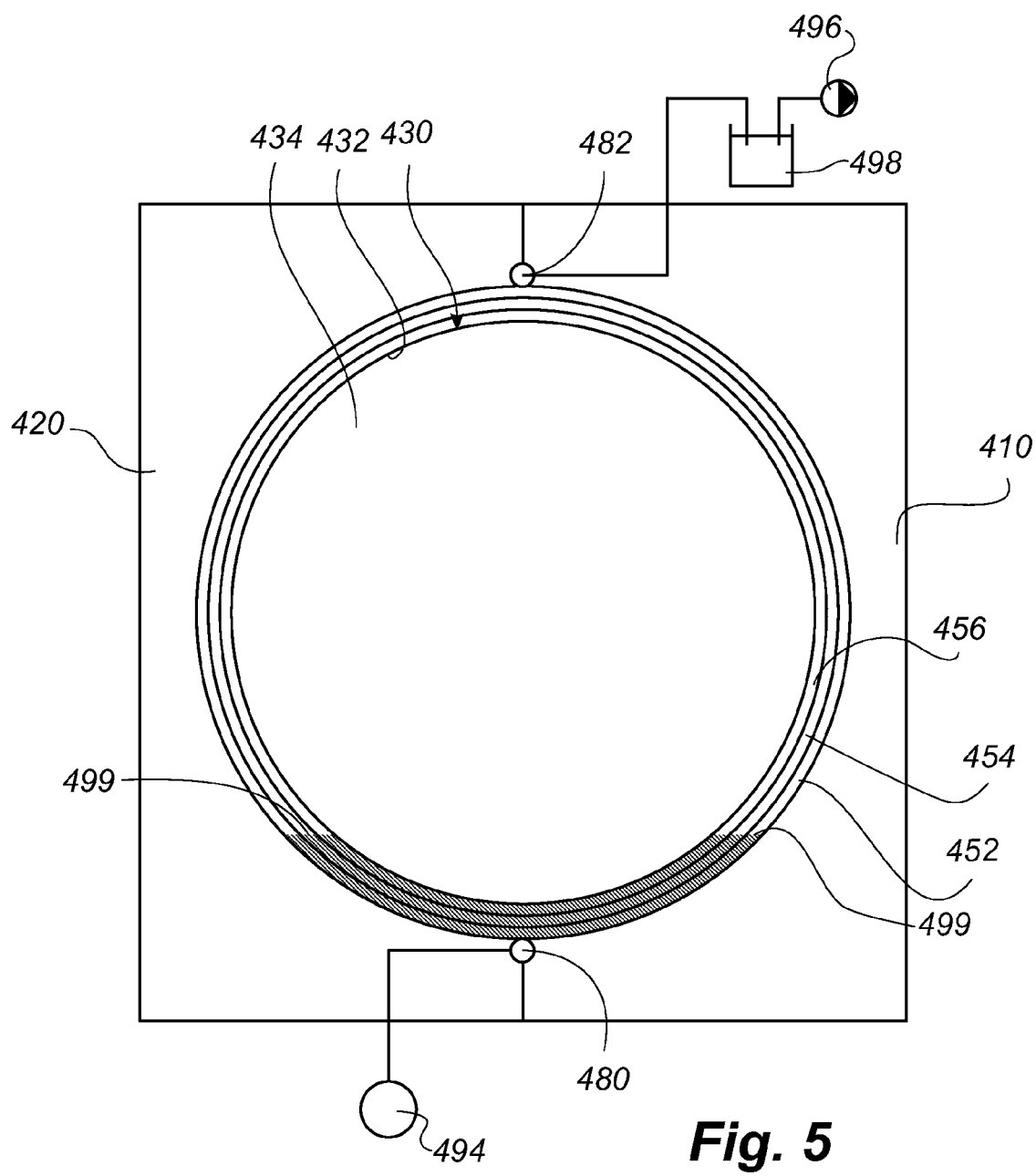
FIG. 5 shows a schematic cross section of the fourth embodiment during an impregnation process.

After all material has been arranged in the mould cavity, the closed mould may, as shown in FIG. 5, be rotated approximately 90 degrees about the longitudinal axis in order to supply liquid from resin inlets 480 connected to a source of uncured resin and assuming a low point in the cross-section of the closed mould. Further, a vacuum outlet 482 connected to a vacuum source 496, such as a vacuum pump, may be arranged at the highest point of the cross-section of the closed mould, optionally with an overflow vessel 498 for collecting resin, which has been sucked into the vacuum outlet 482. By regulating the amount of resin supplied from the resin inlets 480 it is possible to control flow fronts of liquid resin 499 in order to maintain a balance between the injected resin and gravity, thus avoiding the formation of air pockets within the wind turbine blade.

The resin inlet 480 and vacuum outlet 482 need not be positioned at the rim of the mould parts as shown in FIGS. 4 and 5. However, it is important that the resin inlet assumes a low point during the impregnation process. The invention is particularly suited for this kind of moulding, since the larger voids between the steel wires ensure that air in the mould cavity is forced forward by flow fronts of liquid resin during the impregnation or injection process. Thus, it is ensured that no air pockets are formed in the composite structure, i.e. the wind turbine blade. When a wind turbine blade is manufactured as two or more separate shell parts, which are subsequently assembled, e.g. by gluing the parts together, the separate shell parts are often manufactured via a VARTM process using a first rigid mould part and a vacuum bag. Since the vacuum bag is transparent, it is possible to observe the flow fronts of liquid resin. Thus, it is also possible to observe a possible formation of an air pocket. Thereby, an operator may be able to remedy such formations, for instance by reversing the flow fronts by switching the operation of the vacuum outlet(s) and/or the resin inlet(s). However, in a closed, hollow moulding process, it is not possible to observe the propagation of the liquid resin during the impregnation process. Therefore, the use of metallic wires is particularly suited for this kind of moulding.

Figure 15:
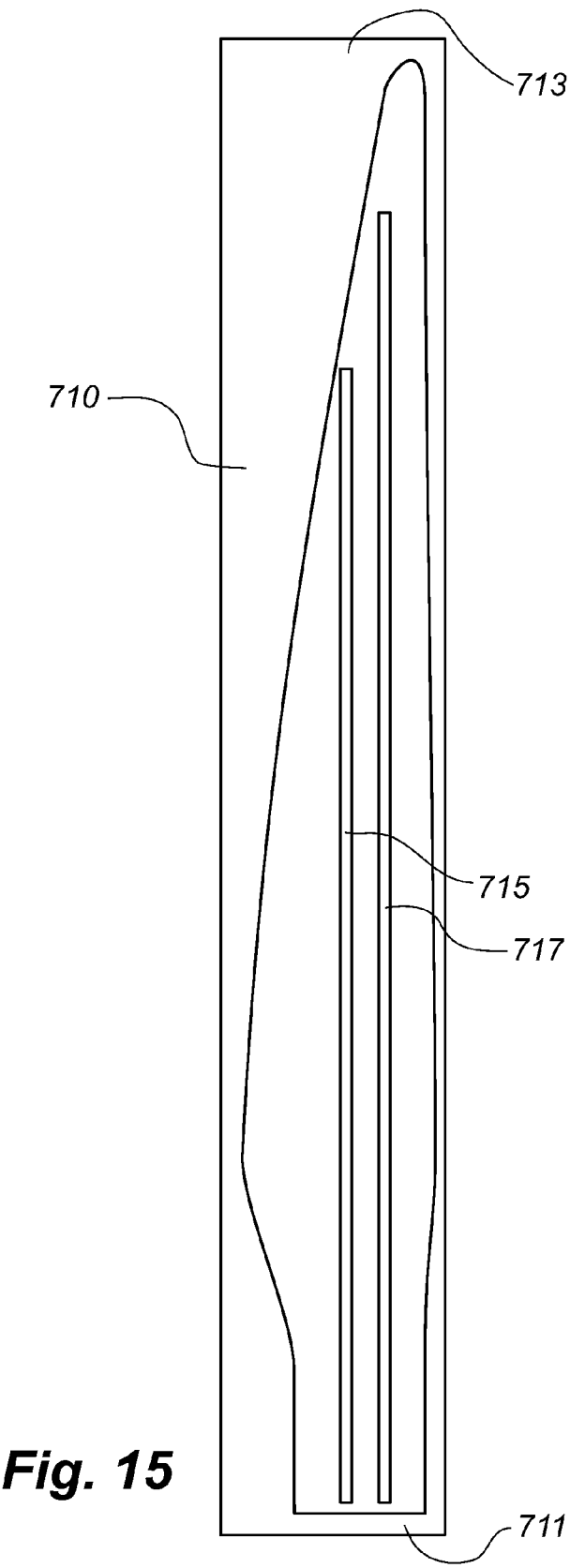
FIG. 15 shows a schematic view of a mould part for manufacturing a wind turbine shell part.

This principle can be used in other moulding aspects, namely that resin is supplied from a low point in a mould cavity and using gravity for preventing the formation of air pockets in the composite structure of the wind turbine blade. Such an idea is illustrated in FIG. 15. In this embodiment, fibre material (not necessarily being metallic fibres) is arranged in a mould part 710. The mould part is oblong and has a first end 711 and a second end 713. Resin inlets 715, 717 is arranged on top of the fibre material. A mould cavity is formed by sealing a vacuum bag (not shown) against the mould part 710. The mould cavity is connected to a vacuum source (not shown) in order to evacuate the mould cavity and drawing in liquid resin. The resin is then supplied from the first end 711 of the mould part 710. Prior to this, the second end 713 of the mould part 710 is elevated in order to form an incline. Thus, the flow front of resin works against gravity, which prevents the formation of air pockets within the finished composite structure. Of course it is also possible to supply resin from the second end 713 and raising or elevating the first end 711 of the mould part 10. Alternatively, the forming surface of the mould part 710 may be formed with an inherent inclination.

Figure 6:
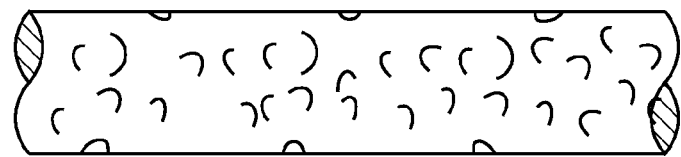
FIG. 6 shows a steel wire with a rough surface.

FIG. 6 shows one embodiment of a steel wire for reinforcing the wind turbine blade. Advantageously, the steel wire has a rough surface. This can for instance be achieved by sand blasting or glass blasting the surface of the steel wire, or by chemically treating the steel wires. Thereby, the resin bonds better to the wire, thereby lowering the probability of delamination of layers comprising such steel wires. Accordingly, it is possible to use non-twisted monowires for the reinforcement of the wind turbine blade.

FIGS. 7-13 depict various embodiments of steel wires and fibre layers comprising steel wires for reinforcement of a wind turbine blade.

FIG. 7 shows a first embodiment, in which five steel wires 510 are arranged in a 5×1 array core with two wrap wires 512, which are wrapped around the five steel wires 510. The wrap wires 512 are tightened around the steel wires 512 in order to share the load between the different wires. The wrap wires 512 may be smaller than the individual wires of the core. Alternatively, the wrap wires 512 may have the same cross-sectional dimension as the core wires 510. The core may comprise any number of steel wires, with or without any wrap wires.

FIG. 8 shows a second embodiment, in which three steel wires 520 are stacked in a core with a wrap wire 522, which are wrapped around the core wires 520. The wrap wire 522 is tightened around the steel wires 512 in order to share the load between the different wires. The wrap wires 512 may be smaller than the individual wires of the core or may have the same cross-sectional dimension as the core wires 520. Alternatively, the core wires may be individually twisted about each other in a longitudinal direction. Such a twisted wire geometry does not need a wrap wire and may create an interlocking geometry, which forms a mechanic interlock with the resin or matrix material.

The core may comprise any number of stacked steel wires and wrap wires. As an example, a third embodiment comprising seven steel wires 530 in a core with two wrap wires 532 is shown in FIG. 9.

According to another advantageous embodiment, the steel wires are arranged in woven, knitted or glue or scrim assembled layers. It is for instance possible to use a polyester knit yarn to spiral the structural wire and optionally using an additional metallic wrapping wire. The wrapping wire may be crossed back and forth between the metallic wires and tied to the wires by the spiralling polyester knit thread. The wrapping wire may be used to create a knitted structure that maintains a given wire spacing. It is also possible to use intermeshing wrapping wires. Alternatively, the wires may be glued onto a backing sheet or a scrim. The backing material may become part of the finished wind turbine blade or it may dissolve in the liquid resin. Thus, a number of different methods of forming a tape comprising the metallic wires is possible. A number of different tapes or rolls of tapes having different widths may be used. These tapes may be arranged in the mould cavity by rolling the tapes in the longitudinal direction of the mould or equivalently the longitudinal direction of the finished wind turbine blade.

The steel wires may be arranged to form a continuous or discontinuous contact line with adjacent wires. The wires may be arranged unidirectional, preferably in the longitudinal direction of the finished wind turbine blade. Alternatively, the wires may be multidirectionally oriented.

It is possible to arrange the metallic wires so as to make them impermeable. However, according to a preferred embodiment the wires are arranged so as to make the layers permeable to liquid resin and so as to be able to quickly wet the layers comprising metallic wires.

FIG. 10 shows a first example of such layers, in which a number of steel wires in form of monowires or monofilaments 540 are arranged on a backing sheet or scrim 544. The steel wires 540 are unidirectionally arranged with a small distance in a transverse direction. Thereby, the resin may easily propagate through the different layers. The backing layer 544 may be a resin distribution layer in order to ensure an efficient resin distribution in the transverse direction.

FIG. 11 shows a second example of such layers, in which a number of reinforcement wires 550 comprising three steel wires 560 is arranged in a core with a wrap wire 562 helically wrapped around the core wires 560. The reinforcement wires 550 are arranged unidirectionally with a discontinuous contact with adjacent reinforcement wires. Due to the discontinuous contact between the reinforcement wires 550, the resin may easily propagate through the different layers. The backing layer 564 may be a resin distribution layer in order to ensure an efficient resin distribution in the transverse direction.

FIG. 12 shows a hybrid mat 570 comprising steel wires 572 and fibres 574 of another type, such as glass fibres, which are woven together. The fibres 574 of the other type may for instance be multistrand glass fibres, where the individual fibres have a diameter, which is substantially smaller than that of the steel wires 572. The hybrid mats may for instance be used for the intermediate layers 292 of the main laminate 270 as shown in FIG. 14. By using different hybrid mats having different quantitative ratios between the steel wires and the second type fibres, a particularly smooth transition in stiffness can be obtained.

FIG. 13 shows another example of a fibre mat 580 comprising steel wires 582, which are retained by intermeshing wrap wires 584. The wires 582 may be arranged on a backing sheet.

The invention has been described with reference to advantageous embodiments. However, the scope of the invention is not limited to the illustrated embodiment, and alterations and modifications can be carried out without deviating from the scope of the invention.

LIST OF REFERENCE NUMERALS 110, 210, 310, 410 first mould part
112, 212, 312, 412 forming surface
114, 214, 314, 414 magnet means/electromagnet
116, 216, 316, 416 magnet means/electromagnet
118, 218, 318, 418 magnet means/electromagnet
120, 220, 320, 420 second mould part/vacuum bag
422 second forming surface
430 mould core
432 outer, flexible core part
434 inner, firm or workable core part
444, 446, 448 magnet means/electromagnets
150, 250, 350, 450 composite structure/wind turbine blade shell part
152, 252, 352, 452 fibre layer
154, 254, 354, 454 fibre layer
156, 456 fibre layer
162, 262, 362, 462 leading edge
164, 264, 364, 464 trailing edge
266 first core part
268 second core part
270 reinforcement section/main laminate/fibre insertion
272 first fibre reinforcement
274 second fibre reinforcement
180, 280, 380, 480 resin inlet
182, 282, 382, 482 vacuum outlet
290 inner fibre layers
292 intermediate fibre layers
294 outer fibre layers
392 prepregs
494 source of uncured resin
496 vacuum source
498 overflow vessel
499 flow fronts
510, 520, 530, 540, 560 steel wires
512, 522, 532, 562 wrap wires
544, 564 backing sheet/scrim
550 reinforcement wire
570, 580 fibre mat
572, 582 steel wires
574 multistrand glass fibres
584 intermeshing wrap wires

The invention claimed is:

1. A wind turbine blade comprising:
   a shell structure comprising:
      a fibre reinforced polymer material comprising:
         a polymer matrix; and
         a fibre reinforcement material embedded in the polymer matrix, the fibre reinforcement material consisting of at least 20% by volume of metallic wires; and
   at least a first longitudinally extending reinforcement section (270) comprising:
      a plurality of fibre layers comprising:
         a number of inner fibre layers (290);
         a number of intermediate fibre layers (292); and
         a number of outer fibre layers (294).

2. The wind turbine blade according to claim 1, wherein the metallic wires have a maximum inner cross-sectional dimension in the range between 0.04 mm and 1mm.

3. The wind turbine blade according to claim 1, wherein at least 30%, by volume of the fibre reinforcement material of the wind turbine blade consists of metallic wires.

4. The wind turbine blade according to claim 1, wherein at least 50% by volume of the fibre in the at least first longitudinally extending reinforcement section (270) consists of metallic wires.

5. The wind turbine blade according to claim 4, wherein at least 60% by volume of the fibre in the at least first longitudinally extending reinforcement section (270) consists of metallic wires.

6. The wind turbine according to claim 1, wherein the metallic wires are steel wires, coated or primed with another metal.

7. The wind turbine blade according to claim 4, wherein the number of outer fibre layers (294) comprises second fibres having a maximum inner dimension, which is substantially smaller than that of the metallic wires.

8. The wind turbine blade according to claim 7, wherein a quantitative ratio between the metallic wires and the second fibres changes gradually from a first ratio at the number of inner fibre layers of the at least first longitudinally extending reinforcement section to a second ratio at the number of outer fibre layers.

9. The wind turbine blade according to claim 1, wherein the number of outer fibre layers comprises chopped or woven fibres oriented in a plurality of directions.

10. The wind turbine blade according to claim 1, wherein the shell structure of the blade comprises a number of fibre layers (570) including both metallic fibres (572) and second type fibres (574).

11. The wind turbine according to claim 4, wherein at least the first longitudinally extending reinforcement section further comprises a number of intermediate resin distribution layers; and wherein the metallic wires are parallel.

12. The wind turbine blade according to claim 1, wherein the metallic wires have a rough surface, provided by sand blasting or glass blasting the surface of the metallic wires.

13. The wind turbine blade according to claim 2, wherein the metallic wires have a maximum inner cross-sectional dimension in the range between 0.07 mm and 0.75 mm.

14. The wind turbine blade according to claim 13, wherein the metallic wires have a maximum inner cross-sectional dimension in the range between 0.1 mm and 0.5 mm.

15. The wind turbine blade according to claim 3, wherein at least 40% by volume of the fibre reinforcement material of the wind turbine blade consists of metallic wires.

16. The wind turbine blade according to claim 15, wherein at least 50% by volume of the fibre reinforcement material of the wind turbine blade consists of metallic wires.

17. The wind turbine blade according to claim 16, wherein at least 60% by volume of the fibre reinforcement material of the wind turbine blade consists of metallic wires.

18. The wind turbine blade according to claim 17, wherein at least 70% by volume of the fibre reinforcement material of the wind turbine blade consists of metallic wires.

19. The wind turbine blade according to claim 18, wherein at least 75% by volume of the fibre reinforcement material of the wind turbine blade consists of metallic wires.

20. The wind turbine blade according to claim 19, wherein at least 80% by volume of the fibre reinforcement material of the wind turbine blade consists of metallic wires.

21. The wind turbine blade according to claim 5, wherein at least 70%, by volume of the fibre in the at least first longitudinally extending reinforcement section (270) consists of metallic wires.

22. The wind turbine blade according to claim 21, wherein at least 75% by volume of the fibre in the at least first longitudinally extending reinforcement section (270) consists of metallic wires.

23. The wind turbine blade according to claim 22, wherein at least 80% by volume of the fibre in the at least first longitudinally extending reinforcement section (270) consists of metallic wires.

24. The wind turbine blade according to claim 9, wherein the chopped or woven fibres are made of glass fibre or carbon fibre.

25. A method for manufacturing a shell construction part of a wind turbine blade, the shell construction part being made of a fibre reinforced polymer material including a polymer matrix and fibre reinforcement material embedded in the polymer matrix and at least a first longitudinally extending reinforcement section, the method comprises the steps of:
  a) providing a forming structure comprising a mould cavity and having a longitudinal direction,
  b) placing the fibre reinforcement material in mould cavity,
  c) providing a resin in the mould cavity simultaneously with and/or subsequently to step b), and
  d) curing the resin in order to form the composite structure, the fibre reinforcement material consisting of at least 20% by volume of metallic wires,
  wherein the first longitudinally extending reinforcement section comprises: a plurality of fibre layers comprising: a number of inner fibre layers; a number of intermediate fibre layers; and a number of outer fibre layers.

26. The method according to claim 25, wherein the mould cavity in the forming structure comprises providing a first mould part having a first forming surface with a contour defining at least a part of an outer surface of the shell construction part, and a second mould part, sealed against the first mould part.

27. The method according to claim 26, further comprising connecting the mould cavity to a source of uncured fluid resin via at least one resin inlet communicating with the mould cavity, and supplying uncured resin from the source of uncured resin to the mould cavity through the at least one resin inlet during step c) and filling the mould cavity with resin; wherein at least one vacuum outlet communicating with the mould cavity is connected to the mould cavity, and the mould cavity is evacuated prior to step c) via the at least one vacuum outlet.

28. The method according to claim 25, further comprising making the shell construction part of the wind turbine blade as one closed piece, the forming structure comprising:
  a mould core and outer mould parts arranged to close around the mould core forming a mould cavity there between, the outer mould parts comprising at least:
  a first mould part comprising a first forming surface with a defining contour defining at least a part of an outer surface of the shell construction part, and
  a second mould part comprising a second forming surface with a defining contour defining at least a part of an outer surface of the shell construction part, and
  wherein the fibre reinforcement material in step b) is arranged on an outer mould part, the mould core, or both.

29. The method according to claim 25, further comprising supplying the liquid resin during step c) from a lower part of the mould cavity.

* * * * *